United States Patent [19]

Miller et al.

[11] Patent Number: 5,068,528
[45] Date of Patent: Nov. 26, 1991

[54] ENCODED SURFACE POSITION SENSOR WITH MULTIPLE WAVELENGTHS AND REFERENCE BEAM

[75] Inventors: Glen E. Miller, Redondo; Rudy L. Prater, Bellevue, both of Wash.

[73] Assignee: The Boeing Company, Seattle, Wash.

[21] Appl. No.: 574,203

[22] Filed: Aug. 28, 1990

[51] Int. Cl.$^5$ .............................................. G01D 5/34
[52] U.S. Cl. ................................ 250/231.13; 250/226
[58] Field of Search ...................... 250/231.13, 231.14, 250/231.16, 226, 227.23, 237 G; 356/375

[56] References Cited

U.S. PATENT DOCUMENTS

| | | | |
|---|---|---|---|
| 3,482,106 | 12/1969 | Anderegg, Jr. et al. | 250/231 |
| 4,334,152 | 6/1982 | Dakin et al. | 250/226 |
| 4,652,747 | 3/1987 | Ellis | 250/231 SE |
| 4,693,544 | 9/1987 | Yamasaki et al. | 350/96.16 |
| 4,707,064 | 11/1987 | Dobrowolski et al. | 350/96.19 |
| 4,748,686 | 5/1988 | Glomb | 455/605 |
| 4,767,925 | 8/1988 | Kawamoto | 250/231 SE |
| 4,769,537 | 9/1988 | Taillebois et al. | 250/231 SE |
| 4,829,342 | 5/1989 | Nishimura | 356/356 |
| 4,849,624 | 7/1989 | Huggins | 250/226 |
| 4,868,385 | 9/1989 | Nishimura | 250/231 SE |
| 4,908,510 | 3/1990 | Huggins et al. | 250/231.13 |

*Primary Examiner*—David C. Nelms
*Attorney, Agent, or Firm*—Christensen, O'Connor, Johnson & Kindness

[57] ABSTRACT

A position sensor for determining the position of an encoded surface applied to an element. Several embodiments of a position sensor (30, 100, 110, 110′, and 200) are disclosed. In each embodiment, light at a reference wavelength and at a test wavelength travel along a common optical path until separated by an interference filter (40, 120, 214). A test beam comprising light at the test wavelength is transmitted through the interference filter toward an encoded surface (44, 216), which reflects a portion and transmits another portion of the test beam. The transmitted portion of the test beam is reflected by a mirror (50, 222) which is disposed adjacent an opposite surface of a rotatable disk (54) or a linear encoder (220) from that on which the encoded surface is applied. The transmitted portion of the test beam is reflected by the mirror along a first optical path (74, 130, 224), while the portion of the test beam that is reflected by the encoded surface travels along a second optical path (68, 138, 230). The relative transmissivity/reflectivity of the encoded surface varies with its position in respect to the point at which the test beam is incident, thereby varying the intensity of the reflected and transmitted portions of the test beam in a predefined manner. A reference beam, which comprises light at the reference wavelength, is reflected by the interference filter along a reference path. The reference beam travels along the reference path and is split by a beam splitter (66, 146, 240). A portion of the reference beam is transmitted toward a mirror (70, 150, 246). The mirror directs the transmitted portion of the reference beam back toward the interference filter, from which it is again reflected along the first optical path. The portion of the reference beam reflected by the beam splitter is also reflected by the interference filter so that it travels along the second optical path, with the portion of the test beam reflected by the encoded surface. Light traveling along the first and second optical paths enters adjacent ends of optical fibers (80, 86) and is conveyed to a sensor assembly (88). A plurality of photodiodes (92, 94, 96 and 98) in the sensor assembly determine the relative intensities of the transmitted and reflected portions of the test and reference beams to define the position of the encoded surface, compensating for light losses in the optical fibers and other parts of the system.

23 Claims, 5 Drawing Sheets

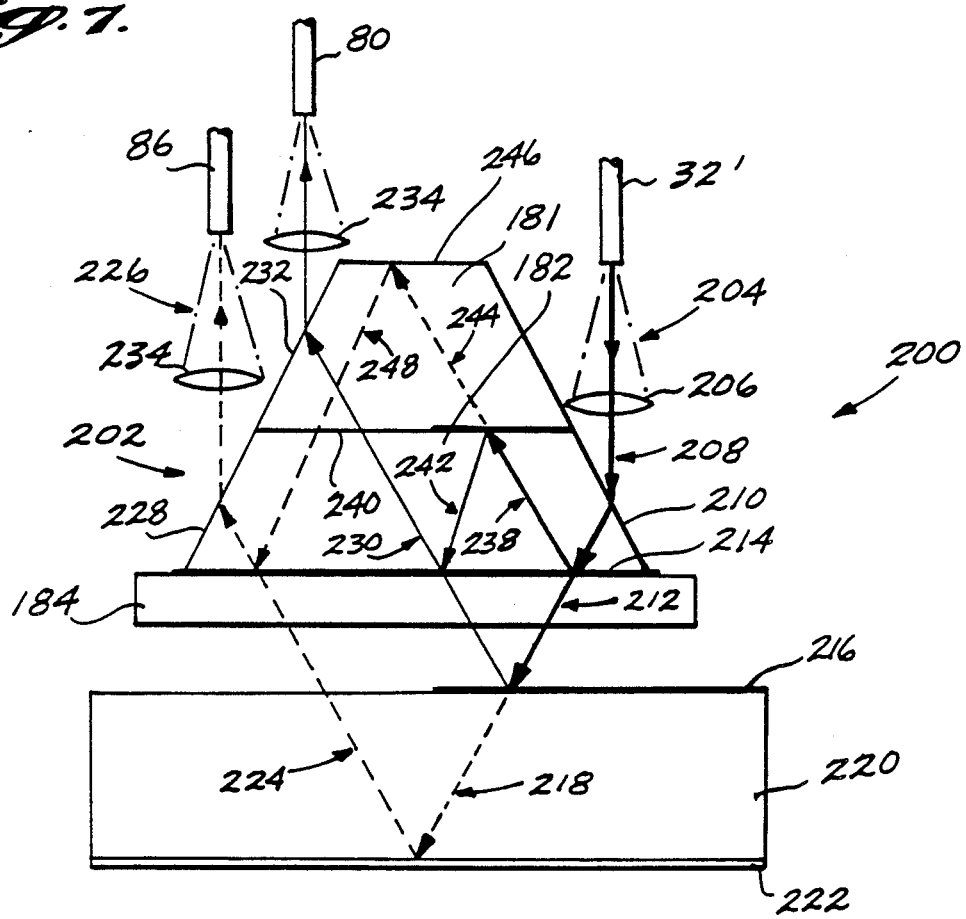

ENCODED SURFACE POSITION SENSOR WITH MULTIPLE WAVELENGTHS AND REFERENCE BEAM

TECHNICAL FIELD

This invention generally pertains to a system for sensing position, and particularly relates to a sensor for monitoring the position of a surface associated with the sensor, which has predefined optical characteristics that vary as the surface moves.

BACKGROUND OF THE INVENTION

Although a variety of electrical and electronic sensors are known for determining the position of a mechanical element, such devices generally suffer from susceptibility to natural and manmade electromagnetic noise and other environmental effects that can degrade their performance. For this reason, electrically passive optical position sensors offer a clear advantage for use in extreme environments and in applications where very high reliability is important. For example, optical sensors will soon be employed on aircraft for sensing the position of control surfaces and may be incorporated into a servo system in which the position command and the position feedback information are generated by two similar optical sensors.

Either digital or analog encoding techniques can be used in an optical position sensing system to precisely determine the position of a rotary shaft or a linear actuator. In these systems, light signals are usually conveyed to and from the sensors by optical fibers. Typically, light propagating through an optical fiber from a remote source is modulated by an encoded track on a mechanical element that rotates or moves linearly. The modulated light signal is conveyed to a light sensor that determines the position of the mechanical element based on the modulated intensity of the light signal.

Both the reflective and transmissive properties of an encoded track have been used in prior art devices for analog modulation of a light signal to sense position. In the case of transmissive modulation, the density of the encoded track varies as a function of its position relative to the light beam passing through it. Alternatively, the reflectivity of the encoded track can be varied with the position of the moving element relative to the incident light beam so that the intensity of light reflected from the encoded surface determines the surface position. In either case, the optical fiber that conveys the modulated light signal to the light sensor is disposed so that the light modulated by the encoded track is directed into it.

Since the intensity of light reaching the remote light sensor is determinative of the position of the mechanical element, any variation in light intensity not caused by the reflectivity or transmissivity of the encoded track represents an error in this determination. For example, instability in the light source intensity or of the light sensor sensitivity, variable light losses in the optical fiber interconnections, or contamination of the exposed optical surfaces of the position sensor can produce a variation in the light intensity perceived at the light sensor, and thus can contribute a significant error in the position determined by the sensor. Furthermore, any such error occurring after the position sensor is calibrated is not readily detectable.

An analog optical position-indicating sensor is disclosed in U.S. Pat. No. 4,769,537 that attempts to compensate for this type of error. In this sensor, light at three different wavelengths is conveyed through a common optical fiber and directed through an encoded track on a movable element. The encoded track is completely transparent to light at two of the wavelengths, but its transmissivity in respect to the third wavelength varies with the position of the encoded track. Light transmitted through the encoded track is conveyed through another optical fiber to two optical couplers disposed adjacent three light sensors. The optical couplers divide the light into three separate beams, each comprising light at one of the three wavelengths, and direct these beams to the light sensors, which determine the relative intensities of the light at each wavelength. By monitoring the ratio of the various light beam intensities at the light sensors, modulation of light intensity at the third wavelength by the encoded track, and thus the position of the moving element, can be determined independently of spurious variations in light intensity that occur in the system. However, since wavelength discrimination occurs at the encoded track, any variation in its transparency with respect to the two wavelengths that it is not intended to modulate (e.g., due to contamination by dirt) causes an error in the position measured by this device. Because the area of the encoded track is typically relatively small, it is more susceptible to the effects of contamination than a larger area would be. A further disadvantage of this optical position sensor is its relative complexity.

Accordingly, it is an object of the present invention to provide an optical position sensor that compensates for variations in the intensity of light signals propagating through the system so as to minimize their effect on the accuracy of the sensor. It is a further object to provide a relatively compact, low cost optical position sensor that monitors the modulation of a light beam by an encoded surface to determine the position of the surface. A still further object is to reduce the opportunity for contamination of the optical surfaces in such an optical position sensor. These and other objects and advantages of the present invention will be apparent from the attached drawings and the Description of the Preferred Embodiments that follows.

SUMMARY OF THE INVENTION

In accordance with the invention, a position sensor is provided which derives position data in respect to an encoded surface having a characteristic light transmissivity that varies as a function of the relative position of the encoded surface. The position sensor includes light source means for producing light at two substantially different wavelengths, including a reference beam having a reference wavelength, and a test beam having a test wavelength.

Initially, the reference and test beams travel toward the encoded surface along a common optical path within the position sensor. Means for separating the reference beam from the test beam deflect the reference beam generally away from the encoded surface along a reference optical path. Splitting means are operative to split the reference beam traveling along the reference optical path between a first and a second optical path.

A first mirror disposed adjacent an opposite side of the encoded surface from the side on which the test beam is incident reflects a portion of the test beam that is transmitted through the encoded surface so that it travels along the first optical path. Another portion of the test beam is reflected from the encoded surface so that it travels along the second optical path. Variations in the transmissivity/reflectivity of the encoded surface modulate the relative intensities of the transmitted and reflected portions of the test beam, respectively propagating along the first and the second optical paths. These light intensities thus define the position of the encoded surface when the transmitted and reflected portions of the test beam are compensated for light losses in the optical paths as a function of the intensities of light at the reference wavelength that is also propagating along the first and the second optical paths.

The means for separating preferably comprise a filter that substantially reflects light at the reference wavelength but transmits light at the test wavelength. Similarly, the splitting means comprise a beam splitter that reflects a part of the reference beam and transmits another part of the reference beam, and a second mirror that reflects the part of the reference beam transmitted through the beam splitter. Further, the splitting means comprise a filter that transmits light at the test wavelength traveling from the first mirror along the first optical path and light at the test wavelength that is reflected from the encoded surface along the second optical path. This filter also reflects the part of the reference beam that was reflected by the second mirror so that it travels along the first optical path, and reflects the part of the reference beam that was reflected by the beam splitter along the second optical path.

The light source means preferably comprise a pair of light emitting diodes, one of the light emitting diodes producing light at the reference wavelength, and the other producing light at the test wavelength. The light source means are disposed at a location remote from the encoded surface. The common optical path comprises an optical fiber that conveys the reference and test beams to the means for separating. Also included are means for collimating light exiting the optical fiber.

In addition, the position sensor can comprise light sensing means, disposed at a location remote from the encoded surface, for separately sensing the intensities of light at the reference and the test wavelengths that is propagating along each of the first and the second optical paths. A pair of optical fibers respectively convey light traveling along the first and the second optical paths towards the light sensing means. Means are preferably provided for focusing that light into the pair of optical fibers.

In one embodiment of the position sensor, a third mirror is positioned to change the direction of the common optical path, deflecting both the test and the reference beams generally towards the means for separating. Alternatively, a third mirror is provided to change the direction of the first and second optical paths so that they are generally parallel to the common optical path.

In another form of the position sensor, a fourth mirror is positioned so as to deflect: (a) the test beam toward the encoded surface from a plane in which the common optical path is disposed; (b) the portion of the test beam transmitted through the encoded surface so that it travels along the first optical path; and (c) the portion of the test beam reflected from the encoded surface so that it travels along the second optical path. The fourth mirror thereby effects a more compact design for the position sensor in which the common optical path and the first and second optical paths are proximate (or parallel) to the encoded surface.

In another compact embodiment of the position sensor, the means for separating, the splitting means, and the first, third, and fourth mirrors comprise a plurality of optical prisms, each prism having a plurality of surfaces. An entrance surface is provided on one of the prisms for entry of light traveling along the common optical path. An exit surface is also provided for light traveling along the first and the second optical paths. Other surfaces of the prisms are coated with thin optical films selected for their optical characteristics. Specifically, these thin optical films are respectively operative to separate the reference beam from the test beam, generally reflect light, and split the reference beam between the first and the second optical paths. The compact form of the position sensor is achieved by bonding the prisms together in a monolithic block.

BRIEF DESCRIPTION OF THE DRAWINGS

FIG. 7 is a schematic elevational view of a fifth embodiment of the position sensor.

DESCRIPTION OF THE PREFERRED EMBODIMENTS

Figure 1:
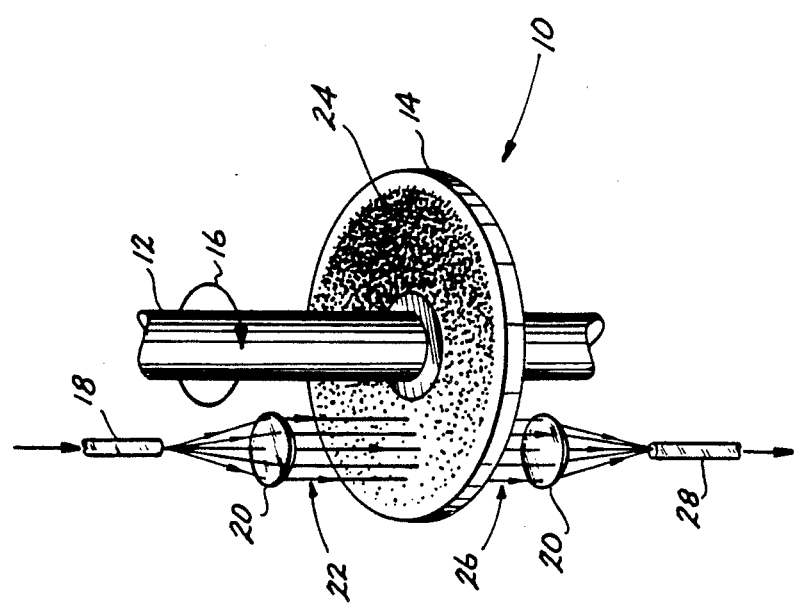
FIG. 1 is an isometric view of a simple prior art analog optical position sensor.

A conventional optical position sensor of the type well known in the prior art is shown in FIG. 1, generally indicated at reference numeral 10. Position sensor 10 monitors the angular position of a rotating shaft 12 to which is affixed a disk 14. Shaft 12 and disk 14 rotate in a direction as indicated by an arrow 16.

A source of light (not shown) located remotely from position sensor 10 provides a light signal that is conveyed to the position sensor through an optical fiber 18. As the light exits the end of optical fiber 18, it diverges toward a double-convex lens 20, which collimates the light into a beam 22 that is incident on the surface of disk 14. Beam 22 is modulated by a coating 24 applied to disk 14. The density of coating 24 varies so that the intensity of the collimated beam 22 directed through disk 14 is modulated by coating 24 as a function of the disk's angular position. Thus, an intensity modulated light beam 26 exits the opposite side of disk 14 and is focused by another double-convex lens 20 toward the end of an optical fiber 28. Optical fiber 28 conveys the modulated light toward a remotely located light sensor (not shown), such as a photodiode or phototransistor.

As explained above, position sensor 10 is potentially subject to error due to variations in the intensity of light produced by the source, variations in light losses within optical fibers 18 and 28, and the accumulation of contamination on coating 24 and on the optical surfaces of the sensor system, e.g., on lenses 20. Accordingly, a significantly error can result in the position of shaft 12 that is determined by position sensor 10. Furthermore, as also noted above, in certain applications, prior art position sensor 10 is not sufficiently compact to fit within the available space.

Figure 2:
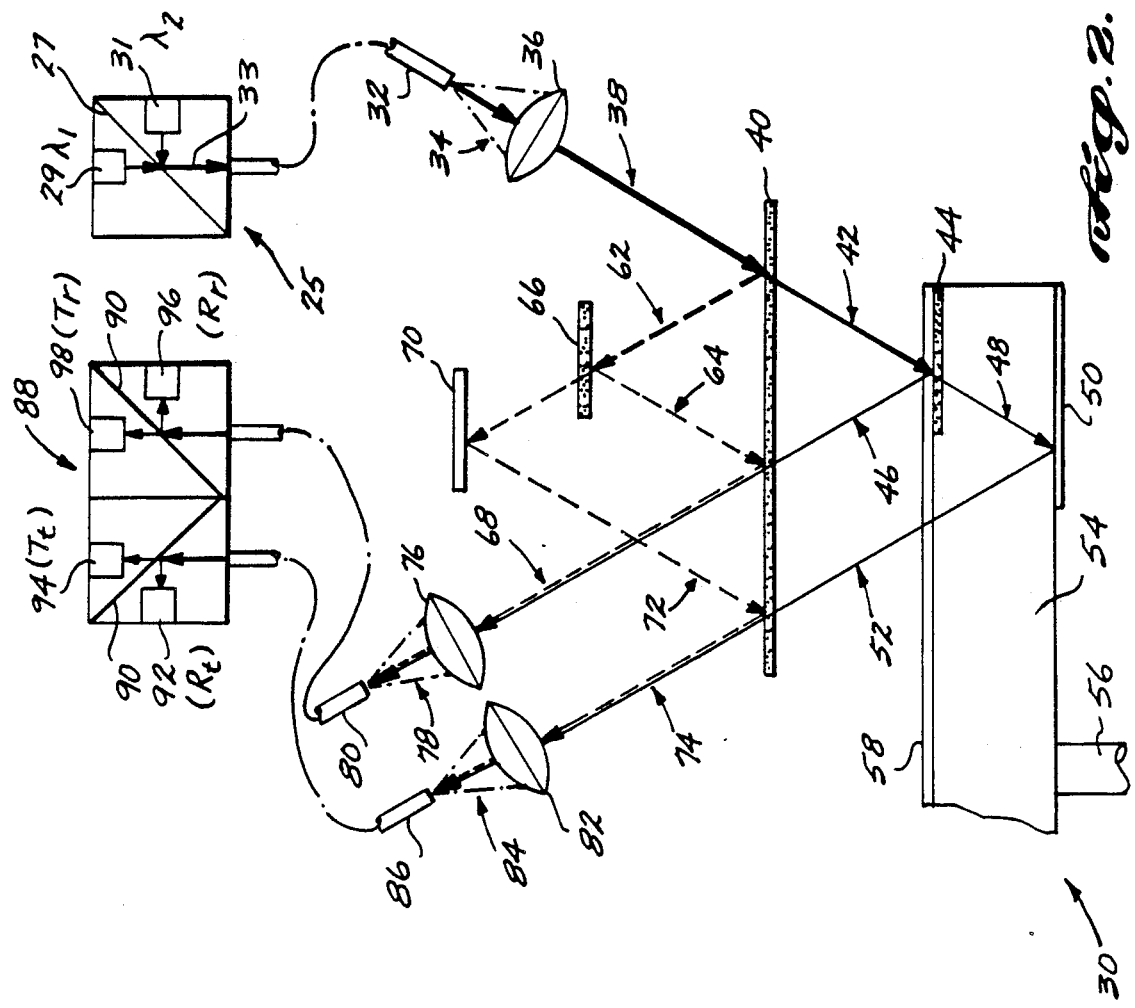
FIG. 2 is a schematic side elevational view of a first embodiment of the present invention for an optical position sensor.

Turning now to FIG. 2, a first embodiment of a position sensor made in accordance with the present invention is shown generally at reference numeral 30. In this and each of the other embodiments of the present position sensor discussed below, light is produced at two different wavelengths, $\lambda_1$ and $\lambda_2$, by two remotely located sources 29 and 31. Sources 29 and 31 preferably comprise light emitting diodes (LEDs) that are mounted in a coupler 25 in which a wavelength selective interference filter 27 is diagonally disposed. Lasers may also be used for sources 29 and 34. Light at the $\lambda_1$ wavelength is transmitted through interference filter 27, while light at the $\lambda_2$ wavelength is reflected from its surface. Interference filter 27 thus couples the light from the two sources into a common optical path 33. Alternatively, (although not shown) a "Y" junction fiber/waveguide, a fused biconic taper coupler, or a white light source, which is filtered, may also be used to provide light at the $\lambda_1$ and $\lambda_2$ wavelengths.

Although these wavelengths are different, $\lambda_1$ and $\lambda_2$ are sufficiently close in value so that any wavelength dependent light losses in the system do not contribute significant error. For example, in the preferred embodiments, a test wavelength $\lambda_1$ equal to approximately 865 nanometers and a reference wavelength $\lambda_2$ equal to 730 nanometers are used. Light at the test and reference wavelengths travels along a common optical fiber 32 from the remote light sources toward position sensor 30. At the end of optical fiber 32, a diverging beam 34 comprising light at both the reference and test wavelengths emerges and is collimated by a double-convex lens 36. The collimated light travels along a common optical path 38 toward an interference filter 40.

Interference filter 40, which is wavelength-selective, reflects light at the reference wavelength from the common optical path and transmits light at the test wavelength. Light at the test wavelength transmitted through the interference filter thus comprises a test beam 42, which is directed toward a rotating disk 54. On the upper surface of the rotating disk is provided an encoded surface 44. Encoded surface 44 has a characteristic transmissivity/reflectivity that varies with the angular position of disk 54 in respect to the incident test beam. Thus, a transmitted portion 48 of test beam 42 passes through both encoded surface 44 and disk 54 toward a mirror 50, which is disposed on the opposite side of the disk from the encoded surface. Mirror 50 reflects transmitted portion 48 of test beam 42 back through the disk along a transmitted test beam optical path 52, which is coincident with a first optical path 74.

Similarly, a reflected portion 46 of test beam 42 (i.e., light at the test wavelength that is reflected from encoded surface 44) is directed along a second optical path 68. The relative transmissivity/reflectivity of encoded surface 44 varies in a defined relationship with respect to the angular position of a shaft 56 so that the intensities of the transmitted and the reflected portions of test beam 42 vary in a corresponding manner. Ideally, encoded surface 44 comprises a coating that is partially transmissive and partially reflective, but has minimal dispersion and absorption characteristics. For example, a metallic coating having a density that varies with its angular position around shaft 56, or a variable density pattern of reflective dots could provide the intensity modulation of test beam 42 required to define the rotational position of disk 54 and shaft 56. Since disk 54 and encoded surface 44 do not significantly absorb light at the test wavelength, virtually all of the light in test beam 42 that is not reflected from encoded surface 44 is transmitted through the disk. Accordingly, either the transmissivity or the reflectivity of encoded surface 44 could independently serve as the position encoding characteristic.

However, the intensity of the reflected and transmitted portions of test beam 42 are each subject to variation due to light losses in the system and if used alone could cause an error in the position determined for disk 54. The present invention uses a reference beam to compensate for such intensity variations, effectively eliminating the error. Specifically, light of the reference wavelength that is reflected from interference filter 40 travels as a reference beam 62 toward a beam splitter 66. A portion of reference beam 62 is transmitted through beam splitter 66 toward a mirror 70, while a reflected portion 64 of light at the reference wavelength is reflected by beam splitter 66 back toward interference filter 40. Interference filter 40 reflects reflected portion 64 of the reference beam along the second optical path 68. Likewise, the transmitted portion of the reference beam is reflected by mirror 70 back toward interference filter 40 and is reflected thereby along first optical path 74.

Accordingly, the transmitted portions of reference beam 62 and of test beam 42 travel together along first optical path 74 and are focused by a double-convex lens 82 into a converging beam 84 that enters the end of an optical fiber 86. Optical fiber 86 conveys these light signals to a light sensor assembly 88, which is disposed at a remote location. The reflected portions of reference beam 62 and of test beam 42 travel together along second optical path 68 and are focused by a double-convex lens 76 in a converging beam 78. Converging beam 78 is directed toward the end of an optical fiber 80, which conveys these light signals to sensor assembly 88.

In sensor assembly 88, an interference filter 90 (that has wavelength sensitive transmission/reflection characteristics similar to interference filters 27 and 40) transmits the transmitted portion of test beam 42 toward a photodiode 94, but reflects the transmitted portion of reference beam 62 toward a photodiode 92. In like manner, another interference filter 90 transmits the reflected portion of test beam 42 to a photodiode 98, and reflects the reflected portion of reference beam 62 to a photodiode 96. Photodiodes 92, 94, 96, and 98 thus produce electrical signals corresponding to the relative intensities of the four light signals arriving at sensor assembly 88. Alternatively, the light sources producing light at $\lambda_1$ and $\lambda_2$ wavelengths can be time multiplexed so that only one photodiode is required to measure the test and reference beam intensities at the distal end of each of optical fibers 80 and 86. Light sensor assembly 88 can also be realized using any of the alternative approaches proposed in the disclosure of coupler 25, i.e., "Y" junction fiber/waveguide, etc., which in this case split the light traveling in each optical fiber.

The angular position of shaft 56, $f(\theta)$, can be determined from these intensities based upon the following relationship:

$$f(\theta) = k \frac{T_t/R_t - T_r/R_r}{T_t/R_t + T_r/R_r} \quad (1)$$

In Equation (1), k is a proportionality constant, $T_t$ corresponds to the intensity of the transmitted portion of the test beam at photodiode 94, $T_r$ corresponds to the intensity of the reflected portion of the test beam at photodiode 98, $R_t$ corresponds to the intensity of the transmitted portion of the reference beam at photodiode 92, and $R_r$ corresponds to the intensity of the reflected portion of the reference beam at photodiode 96.

Inspection of FIG. 2 reveals that position sensor 30 is generally symmetrical about interference filter 40, such that reference beam 62 is split into two paths just like test beam 42. The transmitted and reflected portions of the reference beam and of the test beam are respectively combined in first optical path 74 and second optical path 68. The apparent symmetrical configuration of position sensor 30 clearly illustrates the basic technique used in the present invention to provide corresponding reference signals to correct for any light losses in the test beam traveling through optical fiber 32, or losses in $T_t$ and $T_r$ within optical fibers 86 and 80, and is therefore helpful in understanding the operation of the further embodiments of the position sensor explained below.

Figure 3:
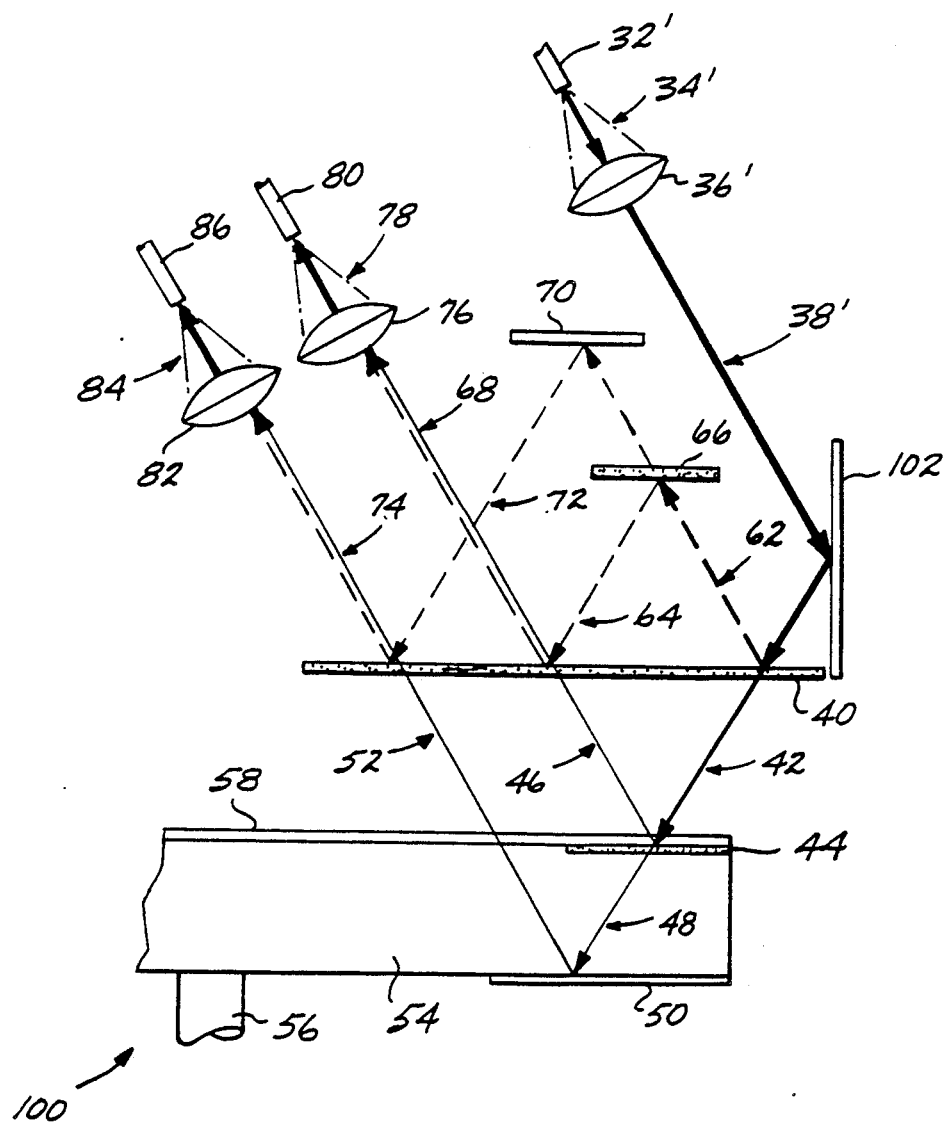
FIG. 3 is a schematic side elevational view of a second embodiment of the optical position sensor.

One potential disadvantage of the configuration of position sensor 30 is that common optical path 38 is not parallel with first and second optical paths 74 and 68. As a result, double-convex lens 36 cannot be mounted coplanar with double-convex lenses 76 and 82, and the longitudinal axis of optical fiber 32 is substantially nonparallel to the longitudinal axes of optical fibers 80 and 86 (near the ends of the optical fibers). A relatively simple solution to this problem is shown in FIG. 3, which discloses a second embodiment of the position sensor generally at reference numeral 100.

Position sensor 100 includes many of the same components as position sensor 30, and the components common to each of the two embodiments have the same reference numerals. Those elements of position sensor 100 that differ slightly in structure or position from otherwise corresponding elements in position sensor 30 are designated with the same reference numeral, but include a prime notation. For example, position sensor 100 receives light at the reference wavelength and the test wavelength through an optical fiber 32' the end of which is generally parallel to the ends of optical fibers 80 and 86.

Light exiting optical fiber 32' forms a diverging beam 34', which is collimated by a double-convex lens 36' along a common optical path 38'. Common optical path 38' is directed toward a mirror 102, which comprises the only additional element in position sensor 100 that is not included in position sensor 30. Mirror 102 is positioned so that it deflects light at both the reference wavelength and test wavelength toward interference filter 40 along the common optical path, as described in respect to position sensor 30. In all other aspects, position sensor 100 operates as already explained in respect to position sensor 30.

A mirror can alternatively be positioned on the opposite side of the position sensor (this configuration is not shown) to reflect light traveling along the first and second optical paths into a pair of optical fibers that are generally parallel to optical fiber 32. In this case, double-convex lenses 76 and 82 must be repositioned to focus the light reflected by this mirror into the ends of the optical fibers.

Figure 4:
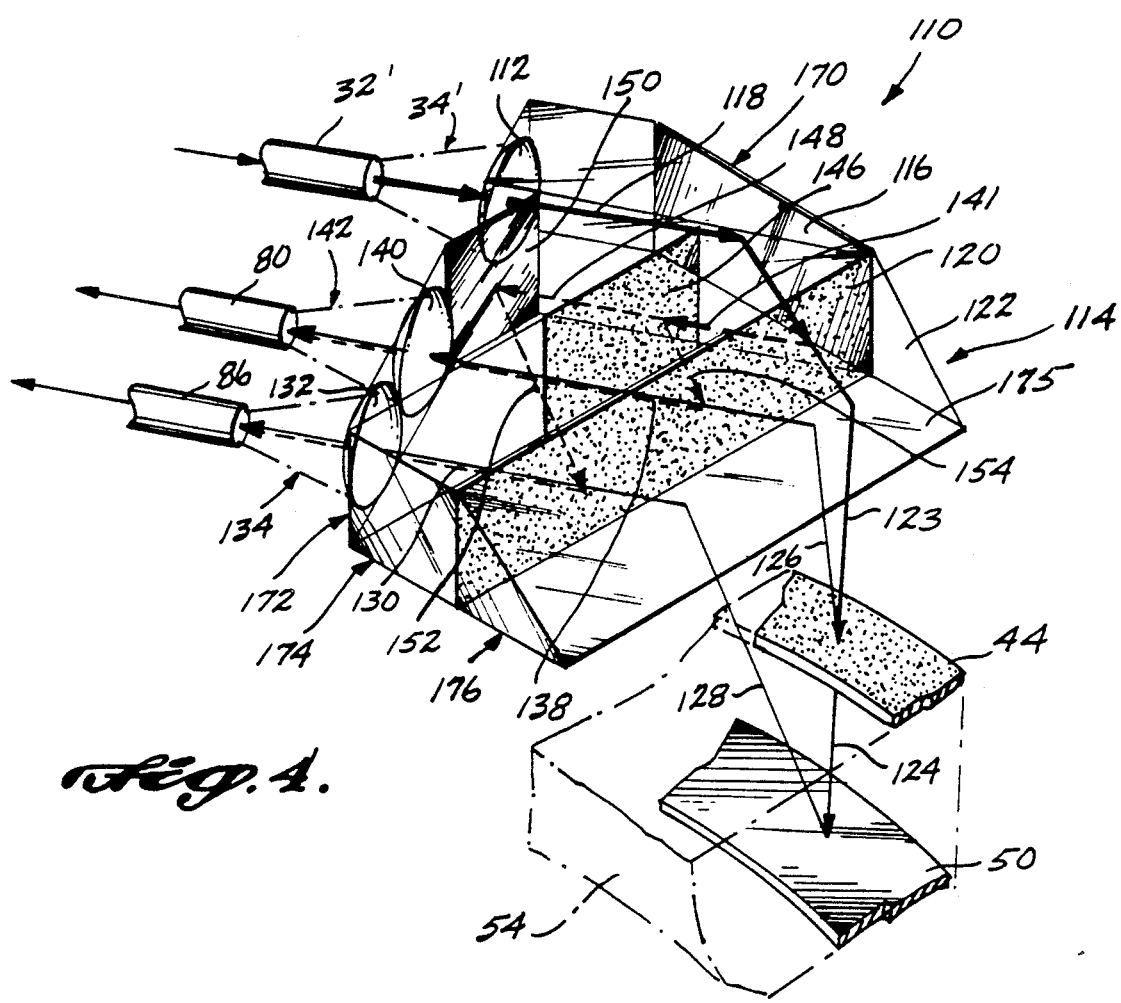
FIG. 4 is an isometric schematic view of a third embodiment of the present invention.
Figure 5:
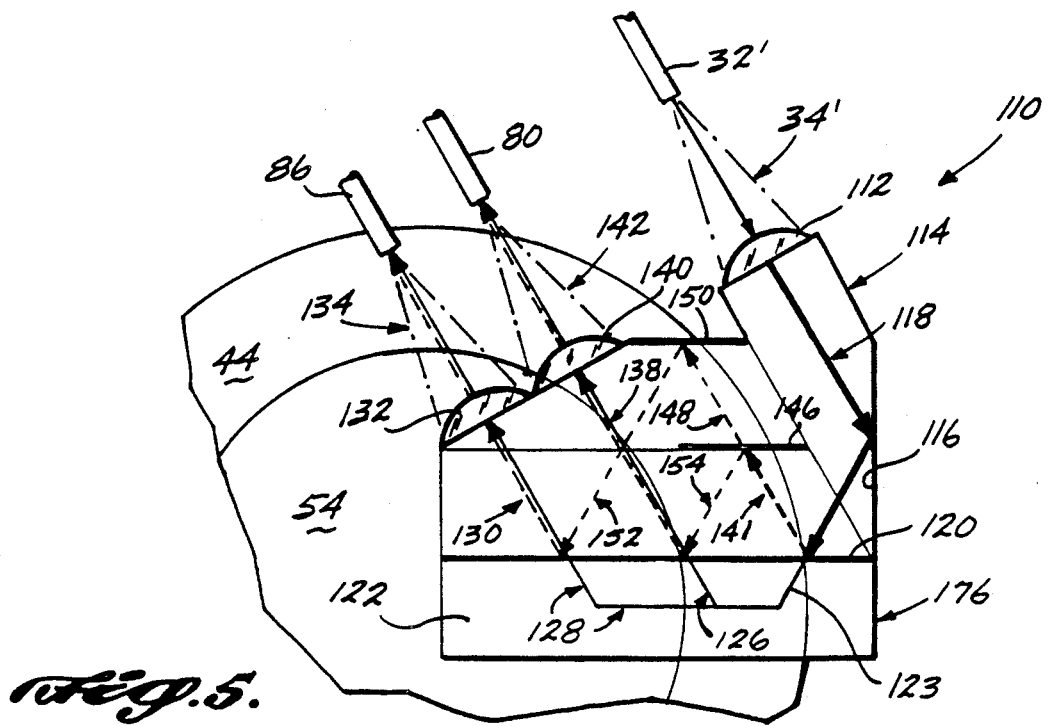
FIG. 5 is a schematic plan view of the third embodiment shown in FIG. 4, illustrating the light paths within the position sensor.
Figure 6:
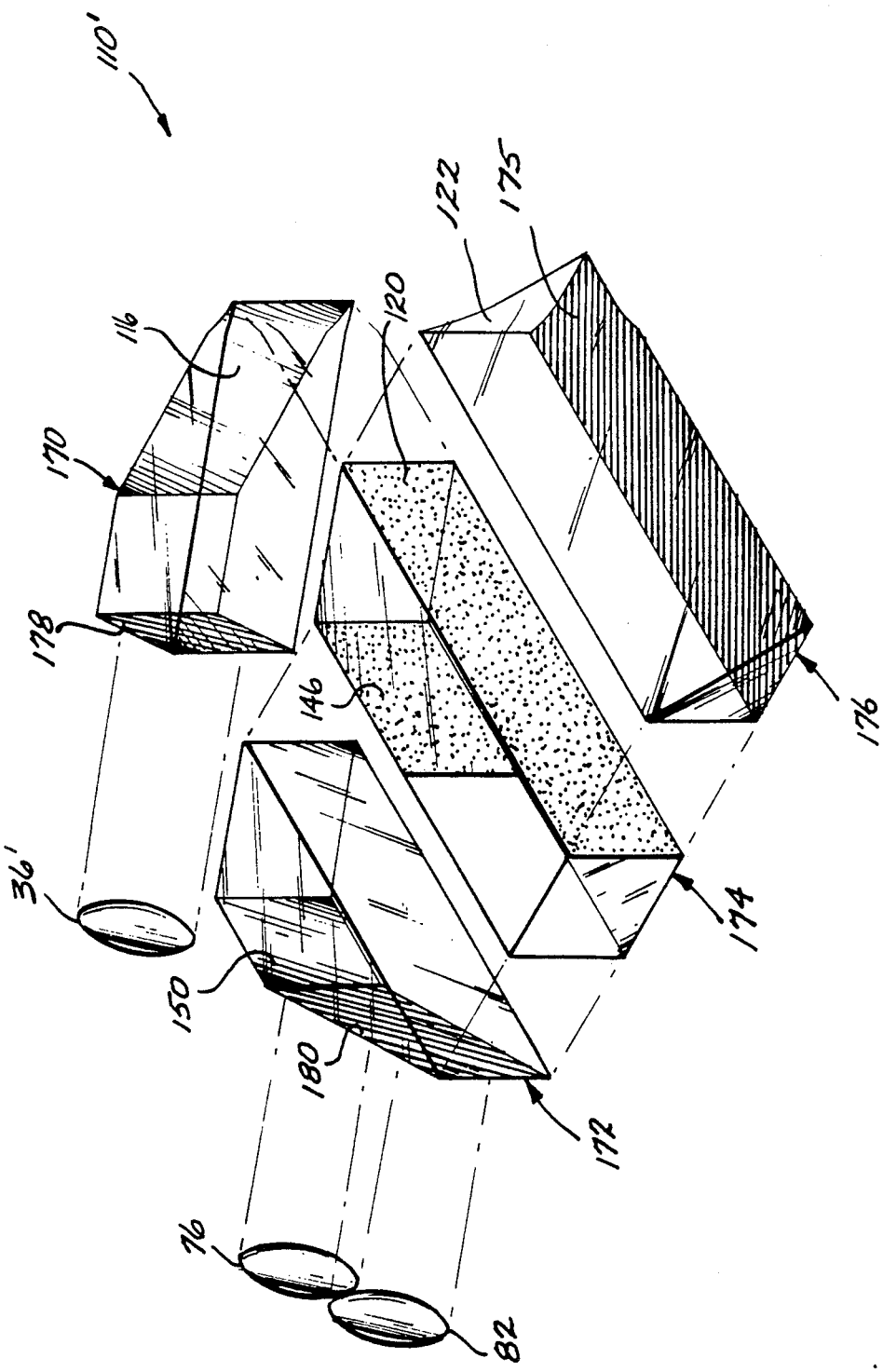
FIG. 6 is a schematic exploded isometric view of a fourth embodiment of the optical position sensor.

With reference to FIGS. 4 and 5, a third embodiment of the position sensor is generally indicated at reference numeral 110, and in FIG. 6, a fourth embodiment 110' is shown. Position sensors 110 and 110' are substantially more compact and mechanically stable than position sensors 30 and 100. To achieve this compact configuration, the separate optical elements used in the first two embodiments of the position sensor are replaced by four glass prisms 170, 172, 174, and 176. FIGS. 4 and 5 illustrate the optical paths followed by the reference and test beams within position sensor 110. As was the case in respect to position sensor 100, position sensor 110 is configured so as to enable the ends of optical fibers 32', 80, and 86 to be positioned in parallel, closely spaced apart from each other and adjacent to the position sensor.

In position sensor 110, light at the reference and test wavelengths exits optical fiber 32' in a diverging beam 34', which is incident upon a lenticular surface 112. Lenticular surface 112 collimates the light from optical fiber 32' into a common optical path 118, which is directed at a mirrored surface 116. Mirrored surface 116 reflects the reference and test beams toward an angled surface 122. However, an interference filter 120, which comprises a thin optical film or other wavelength-specific surface is interposed between mirrored surface 116 and angled surface 122. Interference filter 120 selectively reflects light at the reference wavelength, but transmits light at the test wavelength toward angled surface 122. The transmitted light forms a test beam 123. Due to its total internal reflection of this light, angled surface 122 deflects test beam 123 toward encoded surface 44 on disk 54, which, as in the previous embodiments, modulates the test beam by reflecting a portion 126 and transmitting a portion 124. Transmitted portion 124 of test beam 123 is reflected by mirror 50 back through disk 54 and along a path 128, toward angled surface 122. Portion 126 of the test beam reflected from the encoded surface is also again reflected from angled surface 122. Transmitted portion 124 of the test beam is deflected by angled surface 122 along a first optical path 130, and the reflected portion 126 of the test beam is deflected by the angled surface along a second optical path 138.

The reference beam, which was reflected by interference filter 120, travels along a reference path 141 toward a beam splitter 146. Beam splitter 146 preferably comprises a thin optical film or other surface that transmits a portion 148 of light at the reference wavelength and reflects a portion 154. The reflected portion of the reference beam is again reflected from interference filter 120 along the second optical path 138, traveling with reflected portion 126 of the test beam. Transmitted portion 148 of the reference beam is reflected from a mirrored surface 150 back toward interference filter 120 along a path 152, and is reflected by interference filter 120 along first optical path 130, traveling with transmitted portion 124 of the test beam.

First optical path 130 extends through a lenticular surface 132 that focuses the combined transmitted portions of the test and reference beams in a converging beam 134, which is focused on the end of optical fiber 86. Similarly, the second optical path extends through a lenticular surface 140, which also forms a converging beam 142 that is focused on the end of optical fiber 80, so that the combined reflected portions of the test and reference beams are conveyed along optical fiber 80. Optical fibers 80 and 86 terminate in light sensor assembly 88 (shown in FIG. 2), which produces electrical signals corresponding to the relative intensities of the transmitted portions of the reference and test beams and the reflected portions of the reference and test beams, enabling the angular portion of disk 54 and shaft 56 to be determined in accordance with Equation (1), as already explained.

A significant advantage of position sensor 110, aside from its compact configuration, is the provision of angled surface 122. Angled surface 122 permits the common optical path and the first and second optical paths to be generally coplanar and parallel to encoded surface 44. Thus, these optical paths and the associated optical fibers 32', 86, and 80 can be disposed relatively close and generally parallel to encoded surface 44 of disk 54. In certain applications, space above the encoded surface may be limited, so that position sensor 110 can be used when position sensors 30 and 100 would not fit.

FIG. 6 illustrates how glass prisms 170, 172, 174, and 176 are shaped and fitted together to form a position sensor 110' (and also shows how position sensor 110 is formed). Position sensor 110' is the same as position sensor 110, except that it uses separate double-convex lenses 36', 76, and 82 in place of lenticular surfaces 112, 140, and 132, respectively. These lenses are mounted in a coplanar array that facilitates a compact construction for position sensor 110' by enabling a common support (not shown) to be used for all three lenses. In all other respects, position sensor 110' is the same as position sensor 110.

To assemble position sensors 110 or 110', the surfaces of prisms 170, 172, 174, and 176 are ground and polished flat and parallel (except for the lenticular surfaces on position sensor 110, which are ground to a convex or other suitable shape) to a very high tolerance using standard glass-working equipment. Specific surfaces of the four prisms that abut against each other are coated with appropriate thin optical films having the optical characteristics required for providing the functions of interference filter 120, beam splitter 146, and mirrored surface 150, respectively. Thin optical films are commonly used for such purposes and are well known to those of ordinary skill in optical technology. A thin optical film coating can also be applied to form mirrored surface 116; however, mirrored surface 116 preferably comprises a surface angled to provide total internal light reflection, characteristic of light internally incident at an appropriate acute angle on the surface of a prism. Similarly, angled surface 122 is preferably formed at the appropriate angle to provide total internal reflection of test beam 123 as it travels internally through prism 176.

In position sensor 110', antireflective coatings 178 and 180 are applied to prisms 170 and 172, respectively, on the outer surfaces of these prisms adjacent lenses 36', 76, and 82. All mating surfaces of prisms 170–176 are preferably coated with an ultraviolet curing resin, and the prisms are then assembled in a jig, which allows precise dynamic positioning of the components. After the prisms are properly aligned, the assembly is exposed to high-intensity ultraviolet light, which rapidly cures the resin and forms permanent bonds between the prisms, producing a monolithic block 114, as shown in FIG. 4. This monolithic block presents fewer optical surfaces that can be contaminated by dirt or other residue than position sensors 30 and 100. It also ensures permanent alignment of prisms 170, 172, 174, and 176.

In FIG. 7, a fifth embodiment of the position sensor is shown, generally at reference numeral 200. Position sensor 200 is somewhat simpler in construction than position sensors 110 and 110', but also comprises a monolithic block 202 that includes generally trapezoidal-shaped prisms 181 and 182 stacked atop a rectangular prism 184. Position sensor 200 is constructed in a manner similar to position sensors 110 and 110'.

As in the preceding embodiments, in position sensor 200, light at the reference and test wavelengths exits optical fiber 32', forming a diverging beam 204, which is collimated by a double-convex lens 206. A test beam 212 and a reference beam 238 that are thus collimated travel along a common optical path 208. Common optical path 208 enters a surface 210 of prism 182. Both the reference and test beams are refracted by the change in index of refraction at the glass/air interface of surface 210. Test beam 212 then passes through an interference filter 214, which is interposed between rectangular prism 184 and trapezoidal prism 182. However, reference beam 238 is reflected out of the common optical path by interference filter 214.

After passing through rectangular prism 184, test beam 212 is partially reflected by an encoded surface 216 applied to a linear encoder 220. The reflected portion of test beam 212 travels along a second optical path 230. A portion of test beam 212 is transmitted through encoded surface 216 along an optical path 218, and is reflected by a mirror 222, which is disposed on the opposite surface of linear encoder 220 from that on which the encoded surface is applied. Portion 218 of test beam 212 transmitted through the encoded surface and reflected from mirror 222 continues along a first optical path 224, passing through interference filter 214 and exiting a surface 228 of trapezoidal prism 182. Light traveling along first optical path 224 is focused by a double-convex lens 234 onto the end of optical fiber 86.

The portion of test beam 212 reflected by encoded surface 216 along second optical path 230 exits through a surface 232 of trapezoidal-shaped prism 181 and refracts, passing through another double-convex lens 234, which focuses light traveling the second optical path onto the adjacent end of optical fiber 80. As in the other embodiments, the portion of test beam 212 that is reflected along the second optical path by encoded surface 216 and the portion that is transmitted through the encoded surface depend upon the relative transmissivity/reflectivity characteristics of the encoded surface, which vary along the length of the encoded surface in a predefined manner. Accordingly, the intensities of the transmitted portion of the test beam and the reflected portion of the test beam vary with the position of linear encoder 220 and are used to determine the position of the linear encoder.

Compensation for changes in light loss in the optical fibers, connections and other parts of the position sensing system is provided by reference beam 238, which is reflected from interference filter 214. Reference beam 238 is thus directed toward a beam splitter 240, which reflects a portion 242 of the reference beam back toward interference filter 214 and transmits a portion 244 toward a mirror 246 that is disposed on the top surface of trapezoidal-shaped prism 181. Mirror 246 reflects transmitted portion 244 of the reference beam back toward interference filter 214, which in turn reflects it along first optical path 224, so that it travels with the portion of test beam 212 that was transmitted through encoded surface 216.

Portion 242 of reference beam 238 that was reflected by beam splitter 240 is again reflected by interference filter 214 and travels with the reflected portion of the test beam along second optical path 230. The relative intensities of the transmitted and reflected portions of the test and reference beams are used to determine the position of linear encoder 220, just as explained in respect to the other embodiments, by application of Equation (1). However, in this embodiment, a value f(x) is determined instead of f(θ), where x is the linear position of linear encoder 220.

A number of modifications to each of the embodiments described above will be apparent to those of ordinary skill in the art. For example, lenses 76 and 82 may comprise any combination of optical elements having spherical, aspherical, cylindrical, or other geometrical optical shapes, and may include any combination of refractive, diffractive, or reflective optics, depending upon the design requirements for the position sensor in a specific application. Furthermore, mirrors 50 and 222 need not be attached to disk 54 and linear encoder 220, respectively, but instead may comprise a stationary mirror that is disposed separate and apart from disk 54 or linear encoder 220 so that the transmitted portion of the test beam passes completely through the disk or linear encoder and is reflected by the stationary mirror. In addition, any of the mirrors and/or mirrored surfaces described in respect to the preferred embodiments may comprise an internally reflective surface, or either a dielectric or a metallic coating applied to an appropriate surface of the assembly.

It should also be clear that each of the embodiments may be used in connection with a rotary, linear, or other type of moving or movable encoded surface to determine the position of that surface and the structure to which it is attached. It is also important to note that the motion and position of the encoded surface is relative to the other components of the sensor, e.g., the encoded surface (or disk) may be fixed and the other components movable. Modifications to the preferred embodiments beyond those noted above will be apparent to those of ordinary skill in the art within the scope of the claims that follow. Accordingly, it is not intended that the invention be in any way limited by the description of the preferred embodiments, but instead be determined entirely by reference to the claims.

The embodiments of the invention in which an exclusive property or privilege is claimed are defined as follows:

1. A position sensor, which derives position data in respect to an encoded surface having a characteristic light transmissivity that varies as a function of the position of the encoded surface, said position sensor comprising:
   a. light source means for producing light at two substantially different wavelengths of predefined relative intensity to each other, including a reference beam having a reference wavelength and a test beam having a test wavelength, said reference and test beams initially traveling along a common optical path within the position sensor toward the encoded surface;
   b. means for separating the reference beam from the test beam so that the reference beam is deflected away from the encoded surface along a reference optical path;
   c. splitting means for splitting the reference beam traveling along the reference optical path between a first and a second optical path; and
   d. a first mirror disposed adjacent an opposite side of the encoded surface from the side on which the test beam is incident, said first mirror reflecting a portion of the test beam that is transmitted through the encoded surface along the first optical path, another portion of the test beam being reflected from the encoded surface and traveling along the second optical path, whereby variations in the transmissivity of the encoded surface modulate the relative intensities of the transmitted and reflected portions of the test beam respectively propagating along the first and the second optical paths, thus defining the position of the encoded surface when compensated for light losses in the optical paths as a function of the intensities of light at the reference wavelength propagating along the first and the second optical paths.

2. The position sensor of claim 1, wherein the means for separating comprise a filter that substantially reflects light at the reference wavelength, but substantially transmits light at the test wavelength.

3. The position sensor of claim 1, wherein the splitting means comprise a beam splitter that reflects a part of the reference beam and transmits another part of the reference beam, and a second mirror that reflects the part of the reference beam transmitted through the beam splitter.

4. The position sensor of claim 3, wherein the splitting means further comprise a filter that:
   a. transmits light at the test wavelength that is traveling from the first mirror along the first optical path, and transmits light reflected from the encoded surface along the second optical path;
   b. reflects the part of the reference beam that was reflected by the second mirror along the first optical path; and
   c. reflects the part of the reference beam that was reflected by the beam splitter along the second optical path.

5. The position sensor of claim 1, wherein the light source means comprise a pair of light emitting diodes, one of which produces light at the reference wavelength and the other of which produces light at the test wavelength.

6. The position sensor of claim 1, wherein the light source means are disposed at a location remote from the encoded surface, and wherein the common optical path comprises an optical fiber that conveys the reference and the test beams to the means for separating.

7. The position sensor of claim 6, further comprising means for collimating light exiting the optical fiber.

8. The position sensor of claim 1, further comprising light sensing means, disposed at a location remote from the encoded surface, for separately sensing the intensities of light at the reference and the test wavelengths that is propagating along each of the first and the second optical paths, and a pair of optical fibers that respectively convey light traveling along the first and the second optical paths toward the light sensing means.

9. The position sensor of claim 8, further comprising means for focusing light traveling along the first and the second optical paths into the pair of optical fibers.

10. The position sensor of claim 1, further comprising a third mirror positioned to change the direction of the common optical path, deflecting both the reference and the test beam generally towards the means for separating.

11. The position sensor of claim 1, further comprising a third mirror positioned to change the direction of the first and second optical paths so that they are generally parallel to the common optical path.

12. The position sensor of claim 1, further comprising a fourth mirror positioned so as to deflect the test beam from a plane in which the common optical path is disposed, toward the encoded surface, and to deflect the portion of the test beam transmitted through the encoded surface so that it travels along the first optical path and the portion of the test beam reflected from the encoded surface so that it travels along the second optical path, thereby effecting a more compact position sensor in which the common optical path and the first and second optical paths are proximate the encoded surface.

13. The position sensor of claim 12, wherein the means for separating, the splitting means, and the first, third and fourth mirrors comprise a plurality of optical prisms, each prism having a plurality of surfaces, including an entrance surface on one of the prisms for entry of the light traveling along the common optical path, and an exit surface for light traveling along the first and the second optical paths, other surfaces of the prisms being coated with thin optical films selected for their specific optical characteristics, including separation of the reference beam from the test beam, reflection of light, and splitting the reference beam between the first and the second optical paths, said prisms being joined in a monolithic block.

14. A position sensor for monitoring the ratio of light transmitted through and reflected from an encoded surface, the transmissivity/reflectivity of the encoded surface varying in a predefined way as a function of the position of the encoded surface, said position sensor comprising:
  a. a light source that produces a reference beam and a test beam that travel generally from the light source along a common optical path, said reference beam comprising light at a reference wavelength, and said test beam comprising light at a test wavelength that is substantially different than the reference wavelength;
  b. a plurality of optical prisms, each prism having a plurality of sides, some of which are coated with thin film optical coatings having selected optical characteristics, including:
  a first prism side that deflects light traveling along the common optical path towards a second prism side;
  the second prism side being coated with a thin film optical coating that reflects the reference beam along a reference optical path, but transmits the test beam towards a third prism side, the third prism side directing the test beam toward the encoded surface; and
  a fourth prism side at least a portion of which is coated with a thin film optical coating that splits the reference beam traveling along the reference optical path, reflecting one portion of the reference beam back towards the second prism side, where the one portion of the reference beam is reflected along a first optical path, another portion of the reference beam being transmitted through the fourth prism side towards a fifth prism side;
  the fifth prism side reflecting the other portion of the reference beam back towards the second prism side, where the other portion of the reference beam is reflected along a second optical path that is generally parallel to the first optical path; and
  c. a reflective surface disposed adjacent the encoded surface and positioned so as to reflect a portion of the test beam, which has been transmitted through the encoded surface, along the first optical path, another portion of the test beam being reflected from the encoded surface along the second optical path, whereby the transmissivity/reflectivity of the encoded surface varies the relative intensities of the portions of the test beam propagating along the first and the second optical paths, thus determining the position of the encoded surface when compensated for light losses in the optical paths as a function of the intensities of the portions of the reference beam respectively propagating along the first and the second optical paths.

15. The position sensor of claim 14, wherein the prisms are joined together in a monolithic block.

16. The position sensor of claim 14, wherein the light source comprises a pair of light emitting diodes, one of which emits light at the reference wavelength and the other of which emits light of the test wavelength, said pair of diodes being disposed at a place that is remote from the encoded surface.

17. The position sensor of claim 14, further comprising an optical fiber coupled to the source of light and operative to convey the reference beam and the test beam from the source of light generally towards the plurality of prisms along the common optical path that extends through the optical fiber.

18. The position sensor of claim 14, further comprising light sensing means, disposed at a place remote from the encoded surface, for separately sensing the intensities of the portions of the reference and the test beams propagating along the first and the second optical paths, said light sensing means being coupled to the plurality of prisms by a pair of optical fibers that respectively convey portions of the reference and the test beams separately along the first and the second optical paths.

19. The position sensor of claim 14, wherein an exterior side of one of the prisms comprises a surface through which the common optical path extends.

20. The position sensor of claim 14, wherein a side of one of the prisms comprises a surface through which the first and the second optical paths exit the plurality of prisms.

21. The position sensor of claim 14, wherein at least a part of the common optical path is generally coplanar with at least portions of the first and the second optical paths.

22. The position sensor of claim 14, further comprising means for collimating the reference and the test beams prior to their entry along the common optical path into the plurality of prisms.

23. The position sensor of claim 14, further comprising means for focusing the portions of the reference and test beams respectively traveling along the first and the second optical paths, disposed proximate to where the beams exit the plurality of prisms.

* * * * *

UNITED STATES PATENT AND TRADEMARK OFFICE
CERTIFICATE OF CORRECTION

PATENT NO. : 5,068,528

DATED : November 26, 1991

INVENTOR(S) : G.E. Miller et al.

It is certified that error appears in the above-identified patent and that said Letters Patent is hereby corrected as shown below:

| Column | Line | Error |
|--------|------|-------|
| 4 | 64 | "significantly" should be --significant-- |
| 13 | 13 | "third" should be --third,-- |

Signed and Sealed this

Twentieth Day of April, 1993

*Attest:*

MICHAEL K. KIRK

*Attesting Officer*    *Acting Commissioner of Patents and Trademarks*